US009463992B2

(12) United States Patent
Jiang et al.

(10) Patent No.: US 9,463,992 B2
(45) Date of Patent: Oct. 11, 2016

(54) LASER PROCESSING SYSTEM USING BROAD BAND PULSED LASERS

(71) Applicants: Shibin Jiang, Tucson, AZ (US); Jihong Geng, Tucson, AZ (US); Qing Wang, Tucson, AZ (US)

(72) Inventors: Shibin Jiang, Tucson, AZ (US); Jihong Geng, Tucson, AZ (US); Qing Wang, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

(21) Appl. No.: 14/535,212

(22) Filed: Nov. 6, 2014

(65) Prior Publication Data

US 2015/0121962 A1     May 7, 2015

Related U.S. Application Data

(60) Provisional application No. 61/900,502, filed on Nov. 6, 2013.

(51) Int. Cl.

| | |
|---|---|
| *B23K 26/08* | (2014.01) |
| *C03B 33/08* | (2006.01) |
| *C03C 23/00* | (2006.01) |
| *B23K 26/00* | (2014.01) |
| *B23K 26/20* | (2014.01) |
| *B23K 26/36* | (2014.01) |
| *B23K 26/38* | (2014.01) |
| *C03B 33/02* | (2006.01) |
| *C03B 33/07* | (2006.01) |
| *B23K 26/40* | (2014.01) |
| *B29K 25/00* | (2006.01) |
| *B29K 33/00* | (2006.01) |
| *B29K 105/00* | (2006.01) |
| *B29C 65/16* | (2006.01) |
| *B29C 65/38* | (2006.01) |
| *B29C 65/00* | (2006.01) |

(52) U.S. Cl.
CPC ......... *C03B 33/082* (2013.01); *B23K 26/0057* (2013.01); *B23K 26/0624* (2015.10); *B23K 26/082* (2015.10); *B23K 26/20* (2013.01); *B23K 26/36* (2013.01); *B23K 26/38* (2013.01); *B23K 26/40* (2013.01); *C03B 33/0222* (2013.01); *C03B 33/07* (2013.01); *C03C 23/0025* (2013.01); *B23K 2203/50* (2015.10); *B29C 65/1616* (2013.01); *B29C 65/1635* (2013.01); *B29C 65/1687* (2013.01); *B29C 65/38* (2013.01); *B29C 66/1122* (2013.01); *B29C 66/41* (2013.01); *B29C 66/71* (2013.01); *B29C 66/73366* (2013.01); *B29C 66/949* (2013.01); *B29C 66/952* (2013.01); *B29C 66/959* (2013.01); *B29K 2025/06* (2013.01); *B29K 2033/12* (2013.01); *B29K 2105/256* (2013.01)

(58) Field of Classification Search
CPC ........ B23K 26/40; B23C 59/16; B23C 59/00
USPC .................. 65/102, 112; 219/121.6; 264/400
See application file for complete search history.

(56) References Cited

U.S. PATENT DOCUMENTS

| | | | |
|---|---|---|---|
| 6,423,925 B1 | 7/2002 | Sukhman et al. | |
| 6,462,306 B1 | 10/2002 | Kitai et al. | |
| 7,643,529 B2 * | 1/2010 | Brown | G03F 7/70025 372/55 |
| 8,144,740 B1 * | 3/2012 | Brown | G03F 7/70025 372/32 |
| 2005/0088654 A1 * | 4/2005 | Hu | B23K 26/0604 356/432 |
| 2009/0296758 A1 * | 12/2009 | Brown | G03F 7/7055 372/25 |

FOREIGN PATENT DOCUMENTS

WO     WO2005045476 A2     5/2005

OTHER PUBLICATIONS

Geng et al., "High-spectral-flatness mid-infrared supercontinuum generated from a Tm-doped fiber amplifier," Applied Optics, vol. 51, No. 7, Mar. 1, 2012.

* cited by examiner

*Primary Examiner* — Mark Halpern
(74) *Attorney, Agent, or Firm* — Dale F. Regelman; Quarles & Brady LLP (57) ABSTRACT

A laser material processing system which includes a pulsed fiber laser source having a continuous wavelength bandwidth of larger than 100 nm and pulse width of from 100 femtosecond to 1 microsecond, a broad band laser emitted from one core of an optical fiber, where the broad band laser is applied to a subject material to produce removal of the subject material and/or color change of the subject material.

5 Claims, 8 Drawing Sheets

LASER PROCESSING SYSTEM USING BROAD BAND PULSED LASERS

CROSS REFERENCE TO RELATED APPLICATIONS

This is a Non-Provisional application claiming priority to a U.S. Provisional Patent Application having Ser. No. 61/900,502 filed Nov. 6, 2013, which is hereby incorporated by reference herein.

FIELD

The present invention relates generally to material processing systems, and more particularly to methods using a processing system comprising a single, broadband lasing device.

BACKGROUND

Lasers have long been used for materials processing, including for marking, drilling, ablating, scribing, cutting, welding, and the like. While those lasers commonly used include $CO_2$ lasers at 10.6 micron wavelength, 1.06 micron Nd:Yag lasers, near 1 micron Yb-doped fiber lasers, 532 nm green lasers, 355 nm UV lasers, and 266 nm UV lasers, the specific laser used for any application depends upon the detailed processing requirements. In some cases the average output power is the most important factor. For example for laser cutting and welding of metal, especially thick metal, the average output power has to high enough to melt the relatively amount of metal. In other cases the pulse energy is the most important factor. For example for drilling of materials, the pulse energy has to be high enough to remove the material in short period of time. In order to drill the material with clean edge, the pulse width of the laser is important as well. A shorter pulse can remove the materials in a shorter period of time, typically resulting in a hole with cleaner edge. For example a picosecond laser pulse can produce a cleaner hole than a microsecond laser pulse.

In many cases the laser wavelength is the most important factor, especially for processes wherein the absorption of laser energy is critical. When the materials exhibit stronger absorption, it is easier to perform the laser induced materials processing such as marking, cutting, drilling and welding.

Different materials however have different absorption and reflection spectrum while the typical wavelength bandwidth of a laser is only a few nanometers. In order to effectively expand the bandwidth, one solution is to combine different lasers. For example, U.S. Pat. No. 6,423,925 B1 by Sukhman, et al discloses an apparatus and method for combining multiple laser beams in laser materials processing systems, where each one of multiple laser sources are independently separately mounted on a laser material processing platform and their beam paths are combined by a combiner which includes one or more optical elements mounted in the laser material processing platform. The beam paths are parallel and collinear. The beam path of each laser source and the optical axis of the beam delivery system are each prealigned to the same predetermined reference and automatically coincide upon installation such that these components are rapidly and interchangeably interfaceable.

Similarly, US Patent Publication WO2005045476 A2 by Fu et al discloses a multi-headed laser apparatus combining two or more lasers in a single housing with a single output beam. U.S. Pat. No. 6,462,306 B1 by Kitai et al further discloses a system and method for materials processing using multiple laser beams. The system includes a laser supply system for supplying discrete machining beams that are separated from each other. The lasers can have different wavelengths. For example one is 1064 nm IR laser and the other is 355 nm UV laser.

However, the combining of multiple lasers for material processing applications have numerous drawbacks which are not addressed in the prior art. First, ensuring that two or more different beams are focused to the exactly the same location is extremely challenging. These laser wavelengths are produced by discrete lasers. The laser beams have to be aligned very well in order to reach the exactly the same location on the subjecting processing material after going through collimating and focusing optical elements. Any vibration and temperature induced misalignment could cause the two laser beams to focus on slightly different location, which will affect the material processing quality. For example, if the process is for drilling holes, the hole will not be very circular. If the processing is for cutting, the gap will be larger. If the processing is marking, the marked line will be wider.

But a further drawback is the fact that each laser typically has a linewidth of several a few nanometers, which can not cover the absorption band of many materials. The total laser bandwidth is still relatively small even several lasers are used. For example, the total laser bandwidth will still be mostly less than 10 nanometers when three lasers are combined. As a result such a system is typically custom designed for processing certain types of materials. Additionally, even when multiple lasers are combined, these laser wavelengths are still produced by discrete lasers, so the laser wavelengths are not continuously varied. And of course, the use of multiple lasers increases the price of the overall material processing system.

BRIEF DESCRIPTION OF THE DRAWINGS

Implementations of the invention will become more apparent from the detailed description sent forth below when taken in conjunction with the drawings, in which like elements bear like reference numerals.

DETAILED DESCRIPTION

The present invention is laser processing system that can be used for marking, drilling, ablating, scribing, cutting, welding, and the like. The target material can be organic, inorganic, semiconductor, metals, plastics, and the like.

This invention is described in preferred embodiments in the following description with reference to the FIGS., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 11:
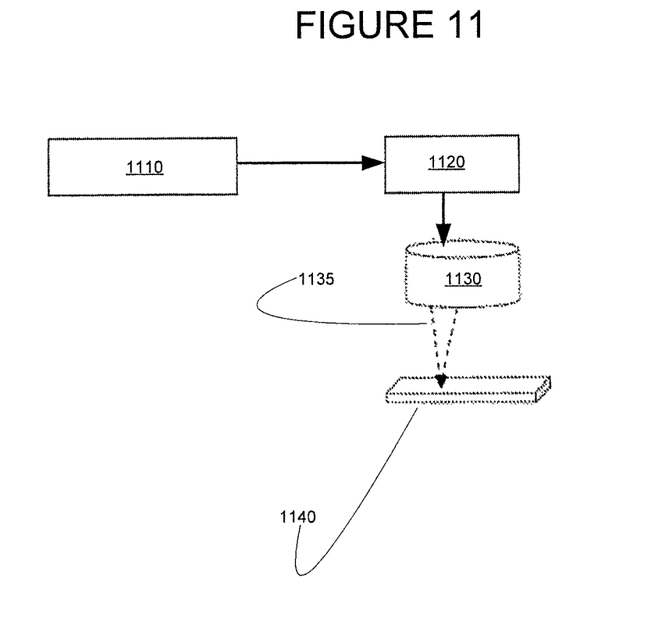
FIG. 11 is a schematic of an embodiment of Applicants' laser processing systems.

There is a need to have a laser material processing device which has a broad bandwidth and spectral linewidth, and preferably where all these laser wavelengths are emitted from the same output. FIG. 11 depicts a schematic of Applicants' laser processing system using broad band pulsed fiber lasers.

Applicants' marking system can be used to mark many types of materials, especially transparent plastics. Transparent plastics exhibit a good transmission of electromagnetic radiation having a wavelength of about 0.4 micron to about 2.0 micron. The absorption increases quickly in most plastic materials, which are mainly caused by the overtone of polymer material bonds, such as C—H.

The broad band spectra of Applicants' laser source described herein significantly increases the absorption of the laser energy. The target material can be ablated or melted during the laser marking process. In some cases, the color of the material will be changed. For example, Applicants observed that transparent plastics can tune into black and other colors. The color of the material can change as well.

Marking can be realized on the surface of inorganic material. For example zirconia crucibles can be marked using Applicants' system. It is also possible to mark glass material. Glass is one of the inorganic materials. Most oxide glasses with no doping exhibit a good transmission with wavelength up to 2.4 micron. Applicants' broad band lasing device described hereinabove has a long wavelength edge of about 2.6 micron. Since metal will absorb most of the laser wavelength, marking on metal is quite straightforward.

FIG. 11 illustrates Applicants' apparatus 1100 for drilling, ablating, scribing, cutting, and welding, of materials that are transparent to laser energy anywhere in the spectrum range of about 1.8 microns to about 2.6 microns. Apparatus 1100 comprises a band lasing device described herein has a long wavelength edge of about 2.6 micron, a beam steering device 1120, a and a lens. FIG. 11 shows a target substrate 1140 receiving a focused lasing energy beam 1135.

Beam steering device 1120 directs the lasing energy to a specific target location on substrate 1140. In certain embodiments, that specific target location is located on a top portion of target substrate 1140. In certain embodiments, that specific target location is disposed within target substrate 1140. In certain embodiments, that specific target location is disposed on a bottom surface of target substrate 1140.

In certain embodiments, broadband lasing device 1110 is intermittently energized when beam steering device 1120 has completed its positioning adjustment(s), and is then de-energized until beam steering device has been repositioned. In other embodiments, broadband lasing device 1110 operates continuously as beam steering device continuously changes the specific target location, thereby allowing scribing onto the surface of the substrate.

The setup illustrated in FIG. 11 can be used for drilling, ablating, scribing, cutting, and welding, et al. In most cases the setup will be modified. Almost in all the cases, a collimated laser beam will be focused on the target 1140. In certain embodiments, beam steering device 1120 comprises a galvanometer based optical scanner where accurate and fast beam movement are needed. In other embodiments, an X-Y station can replace the galvanometer based optical scanner. In most cases, transmissive focusing lens is used to focus the laser beam 1135. In some cases reflective focusing lens is used, where metallic coating are often used. In rare cases, dielectric coating is used.

As those skilled in the art will appreciate, beam steering device 1120 continuously moves a focal point of laser beam 1135 across the surface of a target substrate. Applicants' method utilizes the moving laser beam to scribe information onto a surface of the substrate.

Figure 12:
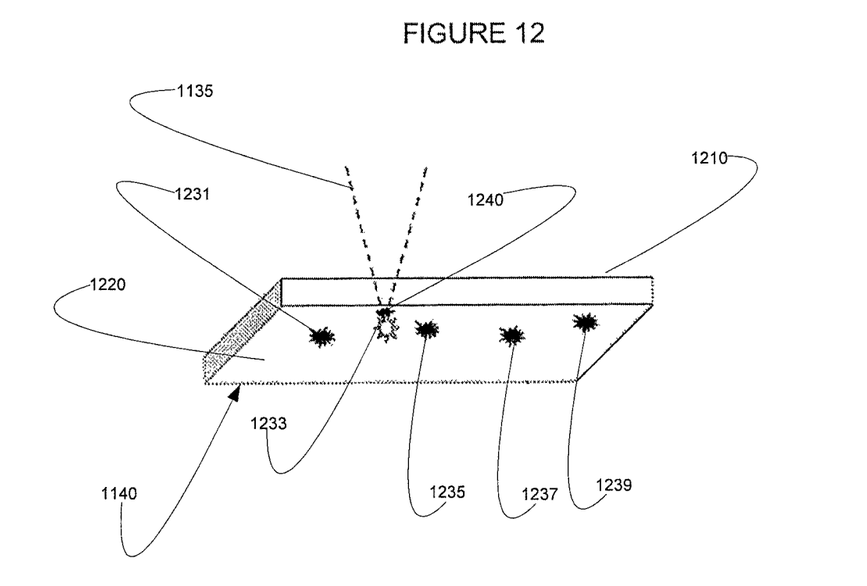
FIG. 12 shows an example of cleaning semiconductor substrate.

FIG. 12 shows an example of cleaning a semiconductor substrate, sometimes referred to as a "wafer." As those skilled in the art will appreciate, semiconductor substrates include silicon, silicon dioxide, aluminum oxide, sapphire, germanium, gallium arsenide (GaAs), and indium phosphide (InP).

Semiconductor material such as silicon has a good transmission when the wavelength is longer than 2 micron while residual materials containing organic components have an increased absorption when the wavelength is longer than 2.2 micron. Applicants' broad band laser described herein is an ideal source for removing these residual materials. In certain embodiments, the laser energy is incident on top surface 1210 of substrate 1140, and that laser energy passes through the substrate to bottom surface 1220. The laser energy then removes surface impurities. In the illustrated embodiment of FIG. 12, laser energy 1135 is shown dislocating impurity 1233 from bottom surface 1140. The dislocated impurity then separates from substrate 1140 by gravity. Use of gravity facilitates this cleaning process.

Figure 13:
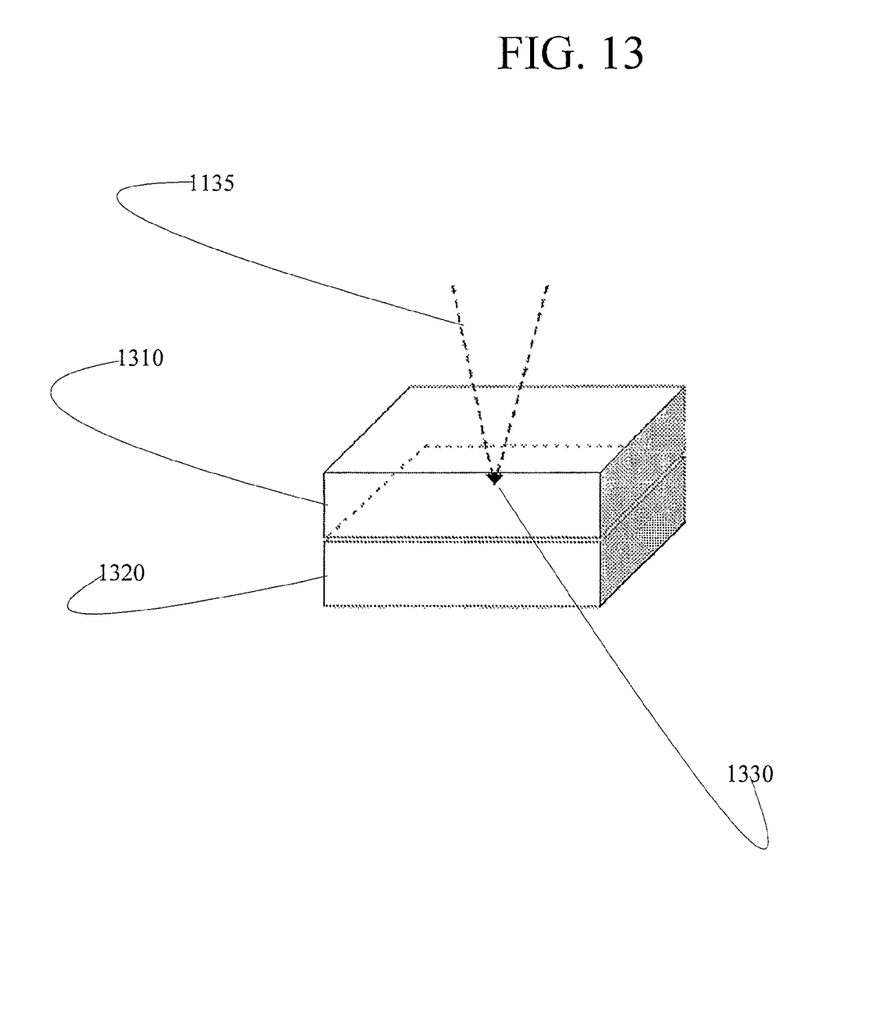
FIG. 13 shows an example of laser welding of two plastic substrates.

FIG. 13 shows an example of laser welding of a first plastic substrate 1310 and a second plastic substrate 1320. Because of the broad band laser source, the absorption varies inside the plastics. It is possible to achieve gradient temperature distribution inside the two pieces of plastic materials, which may result in better performance.

FIG. 13 illustrates directing laser energy from a single pulsed fiber laser source onto a top surface of the first plastic substrate, through the first plastic substrate, and onto both a bottom surface of the first plastic substrate and a top surface of the second plastic substrate. Melting plastic material at the bottom surface of the first plastic substrate and at the top surface of the second plastic substrate effectively welds the first plastic substrate to the second plastic substrate.

One aspect of the present invention is directed to a material processing system using a broad band laser source referred to as a supercontinuum. As used herein, a supercontinuum refers to a bandwidth larger than 100 nm, which it will be appreciated is significantly larger than the total combined bandwidth of several typical lasers. As will be detailed below, the bandwidth of the supercontinuum is broadened to this degree though a nonlinear optical process.

Figure 1:
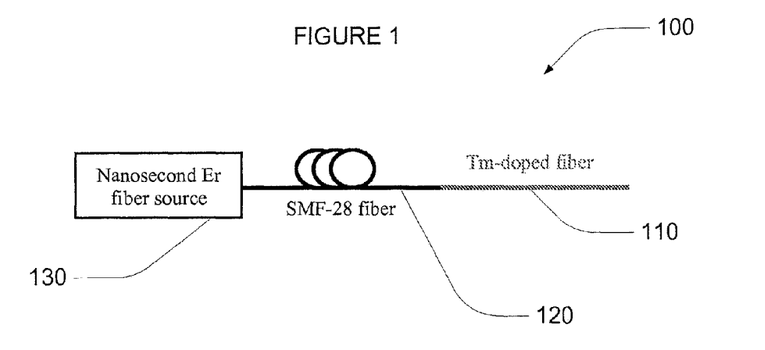
FIG. 1 is a schematic of Applicants' supercontinuum source.

Turning now to FIG. 1, a schematic of one embodiment of a supercontinuum source that can be used with Applicants' system. As can be seen in FIG. 1, Applicants' source 100 is a nanosecond-pulse-pumped Tm-doped fiber amplifier specifically comprising a pump source 130 optically coupled to a first optical fiber 120 that is further optically coupled to a Tm-doped fiber 110. In the present embodiment, pump source 130 comprises an Er-doped fiber MOPA (Master Oscillator Power Amplifier) system which delivers laser pulses at 1.55 μm with a maximum average power of 1 W at a repetition rate of 10 kHz.

The first optical fiber 120 is a passive single mode fiber selected to generate signal pulses near 2 μm by nonlinear optical processes, such as Corning® SMF-28™ or similar. In certain embodiments fiber 120 is a 5 m piece of optical fiber. In other embodiments fiber 120 is more or less than 5 m.

As stated, fiber 120 is coupled to Tm-doped fiber 110, such as by fusion splicing. In certain embodiments, Tm-doped fiber 110 is 50 cm long. In other embodiments, fiber 110 is more or less than 50 cm long. In certain embodiments, Tm-doped fiber 110 is further a single-mode Tm-doped silica glass fiber.

Figure 2:
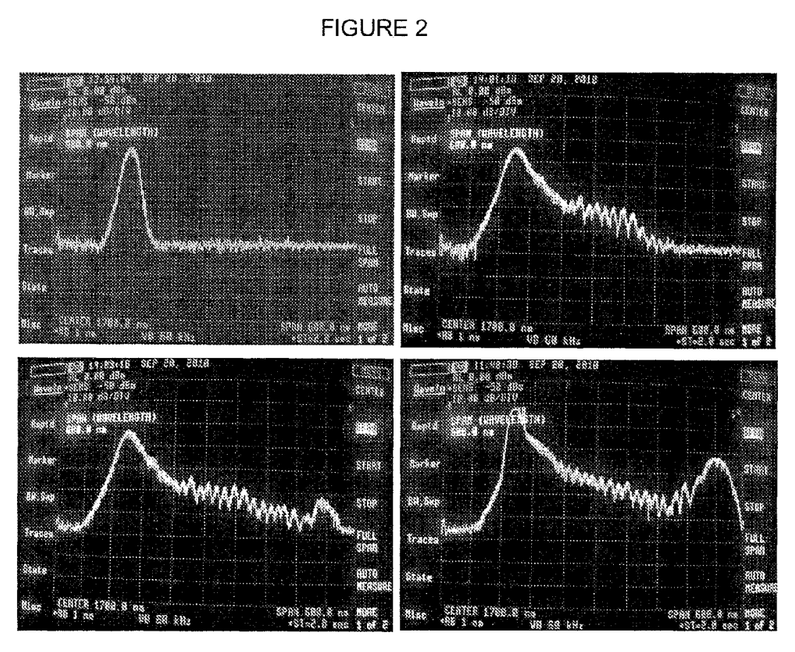
FIG. 2 depicts the spectral evolution of pump pulses in the passive fiber of Applicants' supercontinuum source at different pump power.
Figure 3:
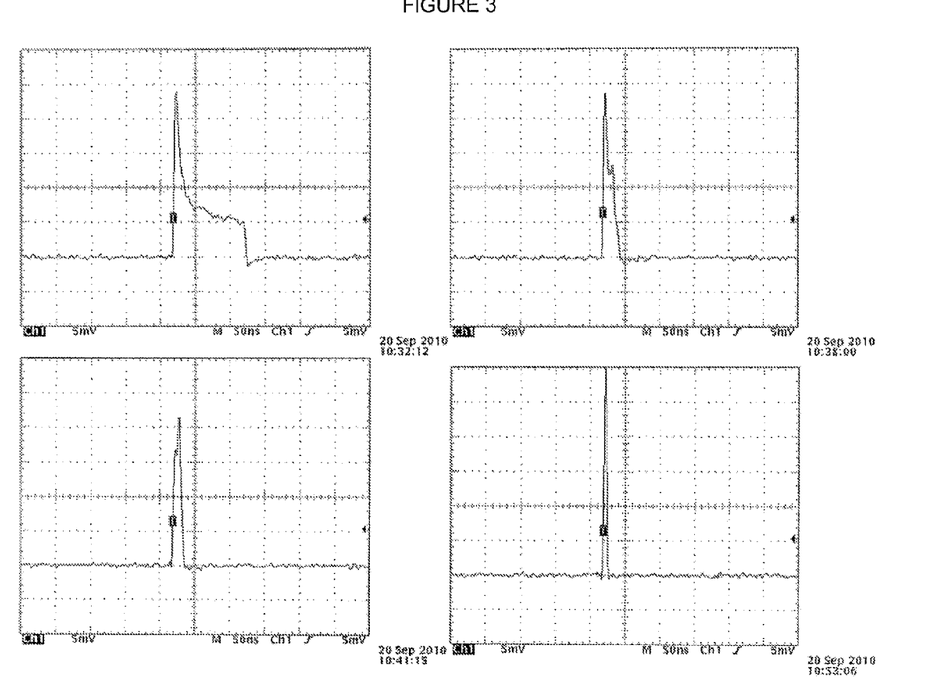
FIG. 3 depicts the pulse shape evolution in the passive fiber of Applicants' supercontinuum source at different wavelengths.

To appreciate the properties of Applicants' source 100, the properties of in fiber 120 should be considered. FIG. 2 by way if illustration, depicts the spectral evolution of pump pulses in fiber 120 when increasing the pump power. Since the laser pulses are spectrally shifted only toward the long wavelength side, it is believed self-frequency-shifted Raman scattering dominates the nonlinear processes in the fiber, as opposed to modulation instability (MI). As can be seen in FIG. 2, as the Er-laser power is increased, a relatively strong spectral component near 1.95 μm gradually develops and becomes dominant. FIG. 3 further shows the typical pulse shapes at different wavelengths. As is shown, the pulse duration reduces as the wavelength of the pulse increases. In particular, the strong spectral component near 1.95 μm has a much shorter duration than the pump pulses and the Raman-shifted pulses. The generated spectral component near 1.95 μm is attributed to solution formation induced by the pump pulses in the passive fiber 120. From the FWHM (full width at half maximum) bandwidth (approximately 40 to 50 nm) of the spectral component at 1.95 μm, a duration of approximately 200 to 300 fs might be expected if it was a solution pulse. By approximately, Applicants mean±10%.

Figure 4:
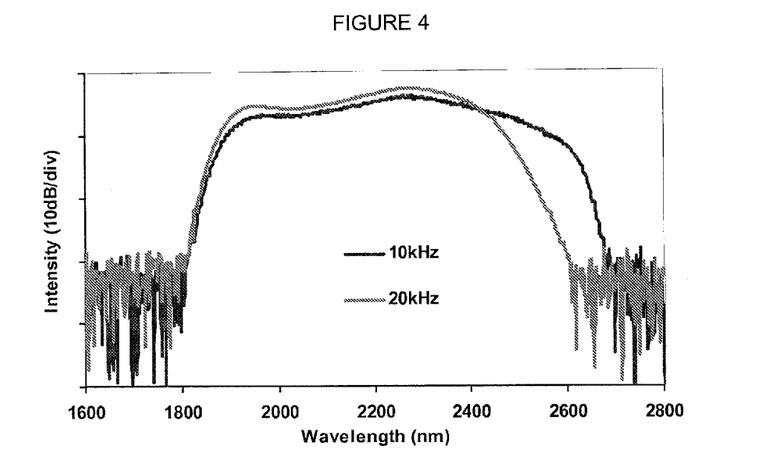
FIG. 4 depicts the spectra of the mid-infrared supercontinuum pulses of Applicants' supercontinuum source.

With the addition of Tm-doped fiber 110 to Applicants' source 100, the laser energy is efficiently converted from a relatively-long pump pulse which is Raman-shifted at short wavelengths (<1.8 μm) to a shorter pulse component at a long wavelength (i.e., 1.95 μm pulse component). Specifically, when the pump pulses and the 1.95 μm pulses are launched into Tm-doped fiber 110, a high-spectral-flatness broadband mid-infrared supercontinuum is generated. FIG. 4 shows typical spectra of the generated from supercontinuum source 100 as measured by an infrared monochromator. As shown in FIG. 4, the FWHM bandwidth is as wide as approximately 600 nm, and the 20 dB bandwidth is approximately 900 nm from 1.8 microns all the way to the long-wavelength transparent edge (approximately 2.7 microns) of the gain fiber.

Figure 5:
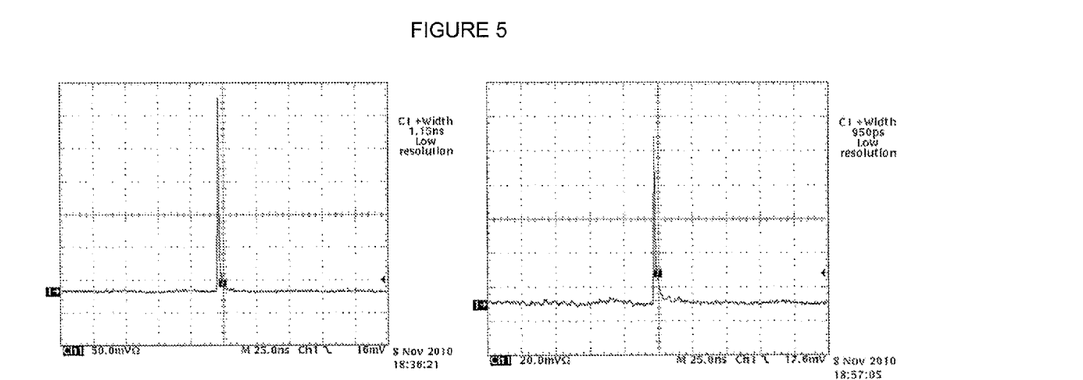
FIG. 5 depicts the typical temporal profile of the mid-infrared supercontinuum pulses of Applicants' supercontinuum source at two different wavelengths.

FIG. 5 further shows the typical temporal profile of the mid-infrared supercontinuum pulses of source 100 at two different wavelengths, where a monchromator is used as a spectral filter in the measurements. As shown, the measured duration of the mid-infrared pulses is about 1 ns at both wavelengths, though this may be limited by the resolution of the detection system. Further, as is shown in FIG. 5, the whole mid-infrared supercontinuum pulses also exhibit a similar single pulse shape with a pulse duration (approximately 1 ns), again as limited by the resolution of the detection system.

Figure 6:
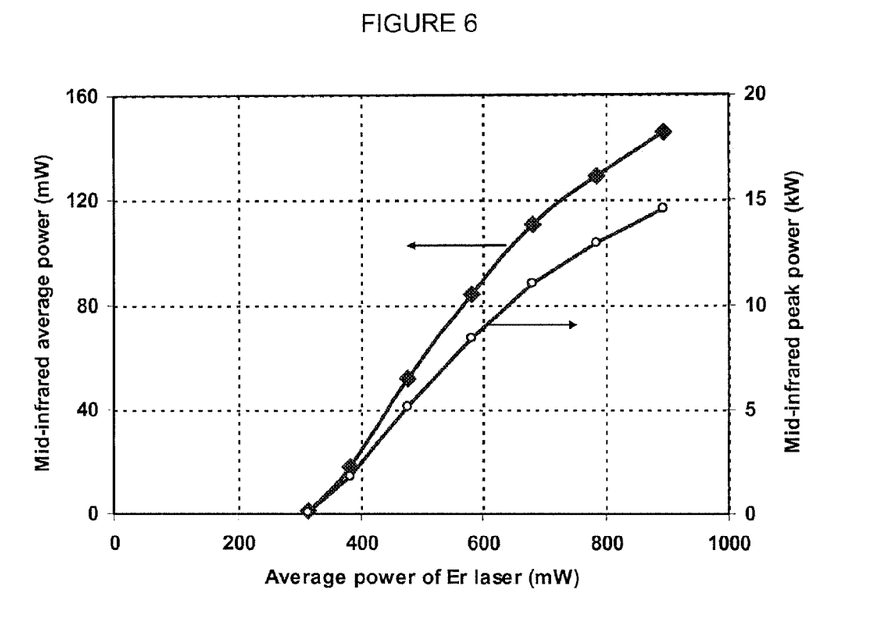
FIG. 6 depicts the average output power and the estimated peak power of the mid-infrared pulses as a function of pump power at 10-kHz repetition rate.

FIG. 6 shows the average output power of source 100 as a function of pump power at 10-kHz. As shown, almost the entire pump pulse and its Raman-scattering components is absorbed by the Tm-doped fiber, and converted into the longer wavelength radiation. The source 100 exhibits a threshold at a pump power of about 300 mW, at which the pulse components near 1.95 μm start to develop (as shown in FIG. 2) and get amplified in the Tm-doped fiber. As the pump power increases, the output power also proportionally increases, but the bandwidth of the mid-infrared radiation only slightly increases. The slope efficiency for wavelength conversion from the near-infrared pump pulses to the mid-infrared pulses is about 32% at low pump power, and gradually decreases when the pump power increases. The saturation in conversion efficiency at a higher pump power is believed to be due to the fact that more energy is converted to the spectral components at longer wavelengths (>2.7 μm), which were in turn are absorbed by the silica gain fiber, due to multi-phonon absorption in the fiber.

The estimated peak power of the mid-infrared pulses of source 100 is further shown in FIG. 6. This estimation is made by assuming the mid-infrared radiation was 1-ns pulses, which is the upper limit of the pulse duration, and then calculating peak power of the mid-infrared pulses. As shown, the peak power of the mid-infrared pulses is as high as >15 kW, emitted from the single-mode active fiber. Since the gain fiber exhibits a mode field diameter of 6.5 μm and 9.7 μm at the wavelength of 1.8 μm and 2.7 μm, respectively, the estimated laser peak intensity of the supercontinuum pulses at the exit of the fiber can be calculated to be >20 GW/cm$^2$.

Further spectral broadening of Applicants' source 100 can be achieved by passing pulses from source 100 through additional fibers. Specifically a longer-wavelength extension is achieved by fiber butt-coupling infrared-transparent nonlinear fiber to Tm-doped fiber 110. In certain embodiments the infrared-transparent nonlinear fiber is a GeSbSe chalcogenide glass fiber. In certain such embodiments the chalcogenide fiber has a core diameter of 30 μm with NA~0.2, which is transparent (<2 dB/m) in the spectral region from 2.0 μm up to 8.0 μm. In other embodiments the infrared-transparent nonlinear fiber is a single-mode fluoride glass fiber. In certain such embodiments the fluoride fiber has a core diameter of 7 μm with NA~0.24, with a transparency of <0.3 dB/m in a shorter spectral region from 0.5 μm up to 4.0 μm.

Figure 7:
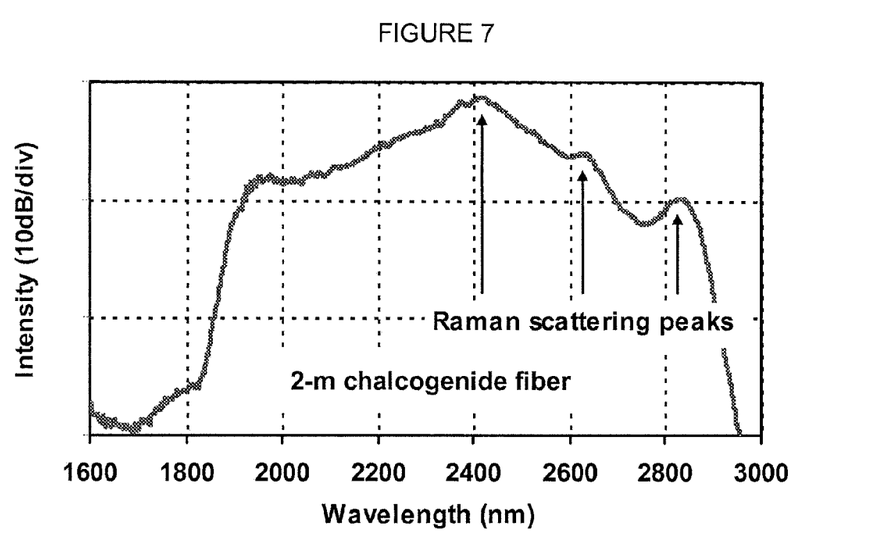
FIG. 7 depicts the spectral broadening of Applicants' supercontinuum source with the addition of a 2-m chalcogenide glass fiber.

FIG. 7 shows the measured spectrum of pulses of Applicants' source 100 that have been passed through a 2-m piece of the chalcogenide glass fiber when the high-peak-power mid-infrared pulses were launched. Compared with the original flat spectra in FIG. 4, three additional spectral peaks at 2.4 μm, 2.6 μm, and 2.8 μm can be seen in the spectrum in FIG. 7, and the long wavelength edge of the mid-infrared pulses are pushed from 2.7 μm to 2.9 μm. Since the frequency interval of the peaks is estimated to be approximately 250-300 $cm^{-1}$, these three peaks can be attributed to cascaded Raman scattering in the chalcogenide glass fiber. Indeed, the Raman shift of Ge—Se bond has been reported to be about 260 $cm^{-1}$.

Figure 8:
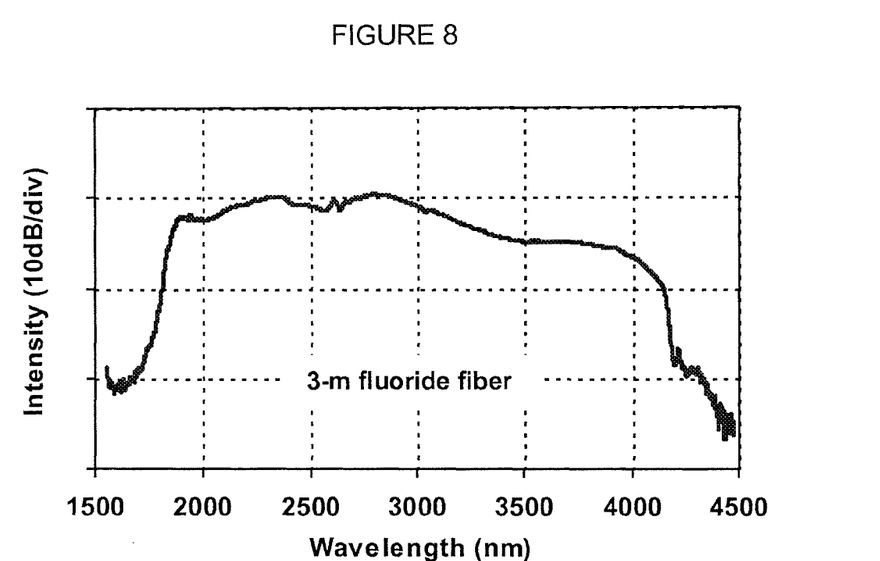
FIG. 8 depicts the spectral broadening of Applicants' supercontinuum source with the addition of a 3-m fluoride glass fiber.

An even more efficient mid-infrared supercontinuum generation is apparent when pulses from Applicants' source 100 are further passed through the single-mode fluoride glass fiber. Specifically, when a 3-m piece of single-mode fluoride glass fiber is used, octave-spanning spectral broadening is easily obtained. FIG. 8 shows the octave-spanning supercontinuum spectra, which covers from 1.7 μm to 4.2 μm. The long wavelength edge of the supercontinuum spectrum is limited however by the transparent limit of fluoride glass fiber.

Figure 9:
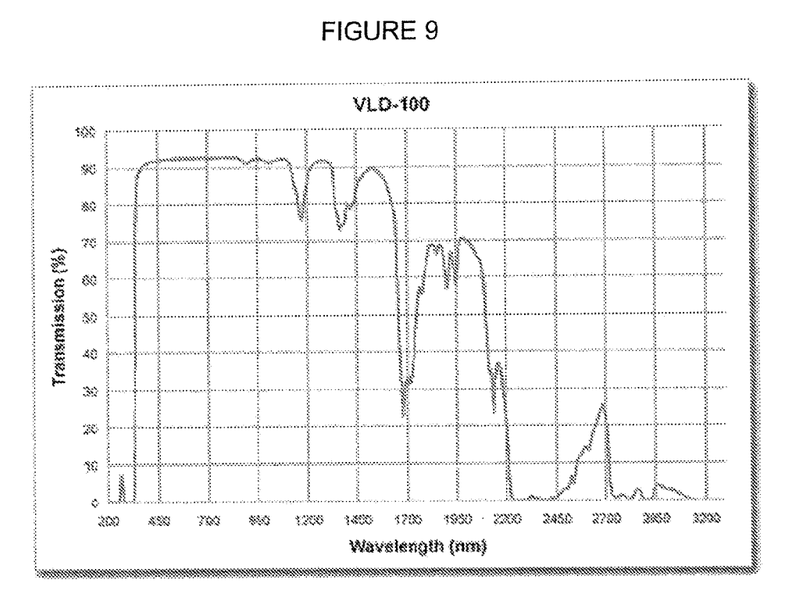
FIG. 9 depicts the transmission curve of a polymethylmethacrylate plastic material.
Figure 10:
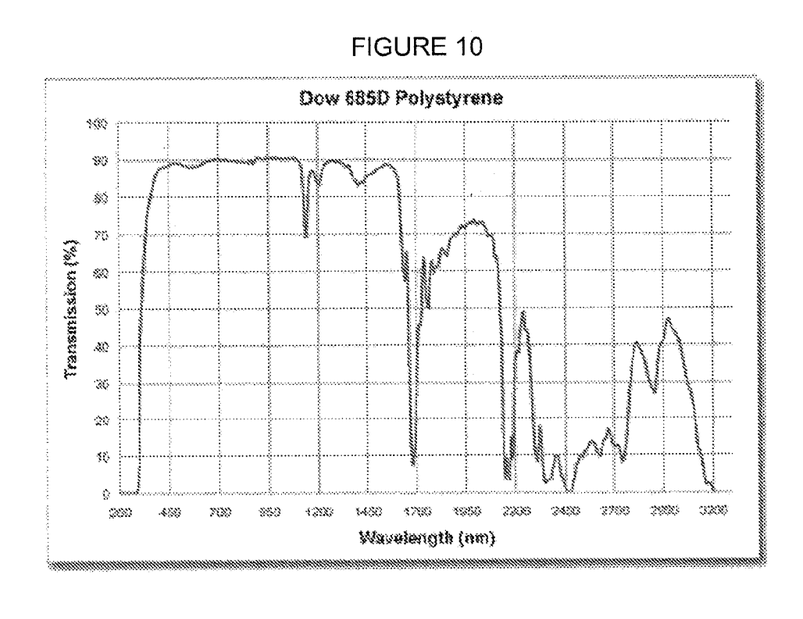
FIG. 10 depicts the transmission of a polystyrene plastic material.

The advantages of using Applicants' source 100 for laser materials processing are many. First, the extremely broad bandwidth can cover the absorption band of many materials. As discussed, FIG. 4 shows the spectral band of Applicants' source 100. The wavelength is near from 1900 nm to 2500 nm, which has a bandwidth of about 500 nm. By comparison, FIGS. 9 and 10 show the transmission of acrylic and polystyrene respectively. These two different plastic materials have different transmission near 2 micron wavelength area. Applicants' supercontinuum source is broad enough to cover some of the absorption bands. Accordingly, source 100 can be used for the materials processing of different plastic materials, especially for plastic materials have a good transparency at visible wavelength.

Further, continuous effects can be produced because of the continued wavelength of the laser source. The supercontinuum laser source 100 is a pulsed laser for time domain but the laser wavelength is continuous from near 1900 nm to near 2500 nm. As will be appreciated, various materials absorb energy at different wavelengths. So the laser energy at a strong absorption wavelength will produce more effect near the surface of a material while the laser energy at a weak absorption wavelength will produce more effect far from the surface, which may result in gradient effect. Additionally, when the surface of a material is damaged, the transmission characteristics will change. In such an instance, the majority of the laser power may be applied to the surface of the material. Further, the laser wavelength in the band is continuous. In other words, the separation of the wavelength is less than 0.01 nm.

Finally, when Applicants' source 100 is used, all wavelengths come out of the same core of the fiber. Accordingly, there are no alignment issues associating with combining multiple discrete lasers as with the prior art.

While the preferred embodiments of the present invention have been illustrated in detail, it should be apparent that modifications and adaptations to those embodiments may occur to one skilled in the art without departing from the scope of the present invention.

We claim:

1. A laser material processing system comprising:
   a pulsed fiber laser source having a continuous wavelength bandwidth of larger than 100 nm and pulse width of from 100 femtosecond to 1 microsecond, a broad band laser being emitted
   wherein:
   all wavelengths are emitted from the same core of said fiber laser source;
   the broad band laser is configured to be applied to a subject material to produce removal of the subject material and/or color change of the subject material.

2. The laser material processing system of claim 1, wherein said laser material processing system is configured to be applied to a polymeric material.

3. The laser material processing system of claim 2, wherein said polymeric material is selected from the group consisting of polystyrene and polymethylmethacrylate.

4. The laser material processing system of claim 1, wherein said laser material processing system is configured to be applied to an inorganic glass oxide.

5. The laser material processing system of claim 1, wherein said laser material processing system is configured to be applied to a semiconductor material.

* * * * *